(12) United States Patent
Painchaud

(10) Patent No.: US 7,142,292 B2
(45) Date of Patent: Nov. 28, 2006

(54) METHODS FOR IMPROVING THE OPTICAL PROPERTIES OF BRAGG GRATINGS

(75) Inventor: Yves Painchaud, Sillery (CA)

(73) Assignee: Teraxion Inc., Sainte-Foy (CA)

( * ) Notice: Subject to any disclaimer, the term of this patent is extended or adjusted under 35 U.S.C. 154(b) by 260 days.

(21) Appl. No.: 10/831,338

(22) Filed: Apr. 23, 2004

(65) Prior Publication Data
US 2004/0252364 A1   Dec. 16, 2004

(30) Foreign Application Priority Data
Apr. 25, 2003   (CA) .................................. 2426935

(51) Int. Cl.
*G01N 21/00* (2006.01)
(52) U.S. Cl. .................................... 356/73.1
(58) Field of Classification Search ................. None
See application file for complete search history.

(56) References Cited
U.S. PATENT DOCUMENTS

| | | | |
|---|---|---|---|
| 5,367,588 A | 11/1994 | Hill et al. | |
| 6,104,852 A * | 8/2000 | Kashyap | ................. 385/123 |
| 6,393,172 B1 * | 5/2002 | Brinkman et al. | ............ 385/16 |
| 6,501,883 B1 | 12/2002 | Painchaud et al. | |
| 6,842,545 B1 * | 1/2005 | Lackritz et al. | ................ 385/14 |
| 2003/0059164 A1 | 3/2003 | Stepanov et al. | |
| 2003/0186142 A1 | 10/2003 | Deshmukh et al. | |

OTHER PUBLICATIONS

Komukai, T., et al., "Very Low Group Delay Ripple Characteristics of Fibre Brag Grating with Chirp Induced by an S-Curve Bending Technique", Electron. Lett., vol. 37, pp. 449-451 (2001).
Komukai, T., et al., "Group Delay Ripple Reduction and Reflectivity Increase in a Chirped Fiber Bragg Grating by Multiple-Overwriting of a Phase Mask with an Electron-Beam", IEEE Photon. Technol. Lett., vol. 12, pp. 816-818 (2000).
Komukai, T., et al., "Group-Delay Ripple Reduction in Step-Chirped Fiber Bragg Gratings by Using Laser-Beam Written Step-Chirped Phase Masks", IEEE Photon Technol. Lett., vol. 14, pp. 1554-1556 (2002).
Buryak, A.V., et al., "Correction of Systematic Errors in the Fabrication of Fiber Bragg Gratings", Opt. Lett., vol. 27, pp. 1099-1101 (2002).
Sumetsky, M., et al., "Reduction of Chirped Fiber Grating Group Delay Ripple Penalty Through UV Post Processing", Tech. Dig. Postdeadline papers, OFC'2003, PD 28.

(Continued)

*Primary Examiner*—Tu T. Nguyen
(74) *Attorney, Agent, or Firm*—Darby & Darby

(57) ABSTRACT

Methods to improve the optical properties of Bragg gratings are disclosed. A first method includes a post correction of the refractive index profile by applying an average index correction thereto. The average index correction is obtained through an analysis of the defects of the refractive index profile characterised through a reconstruction thereof. A second method includes a pre-correction to the refractive index profile by characterising the defects of a test grating, and again calculating an average index correction based thereon. Further gratings are then made using a corrected refractive index profile.

33 Claims, 10 Drawing Sheets

OTHER PUBLICATIONS

Hill, K.O., et al., "Chirped In-Fiber Bragg Gratings for Compensation of Optical-Fiber Dispersion", Optics Letters, vol. 19, pp. 1314-1316 (1994).

Hill, K.O., et al., "Chirped In-Fibre Bragg Grating Dispersion Compensators: Linearisation of Dispersion Characteristic and Demonstration of Dispersion Compensation in 100 km, 10Gbit/s Optical Fibre Link", Electronics Letters, vol. 30, pp. 1755-1756 (1994).

Feced, R., et al., "An Efficient Inerse Scattering Algorithm for the Design of Nonuniform Fiber Bragg Gratings", IEEE J. Quantum Electron., vol. 35, pp. 1105-1115 (1999).

Skaar, J., et al., "On the Synthesis of Fiber Bragg Gratings by Layer Peeling", IEEE J. Quantum Electron., Vo. 37, pp. 165-173 (2001).

Krug, P.A., et al., "Measurement of Index Modulation Along an Optical Fiber Bragg Grating", Optics Letters, vol. 20, pp. 1767-1769 (1995).

Aslund, M., et al., "Novel Characterization Technique with 0.5 ppm Spatial Accuracy of Fringe Period in Bragg Gratings", Opt. Express, vol. 11, pp. 838-842 (2003).

Cole, M.J., et al., "Moving Fiber/Phase Mask-Scanning Beam Technique for Enhanced Flexibility in Producing Fibre Gratinsg with Uniform Phase Mask", Electronics Letters, vol. 31, pp. 1488-1490 (1995).

\* cited by examiner

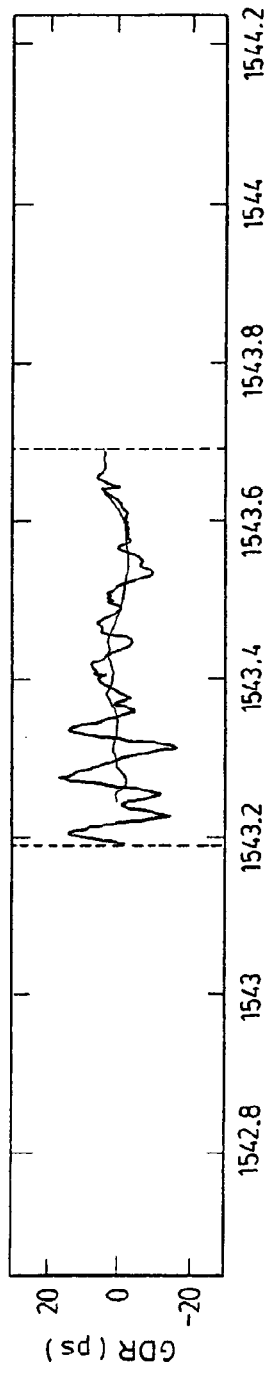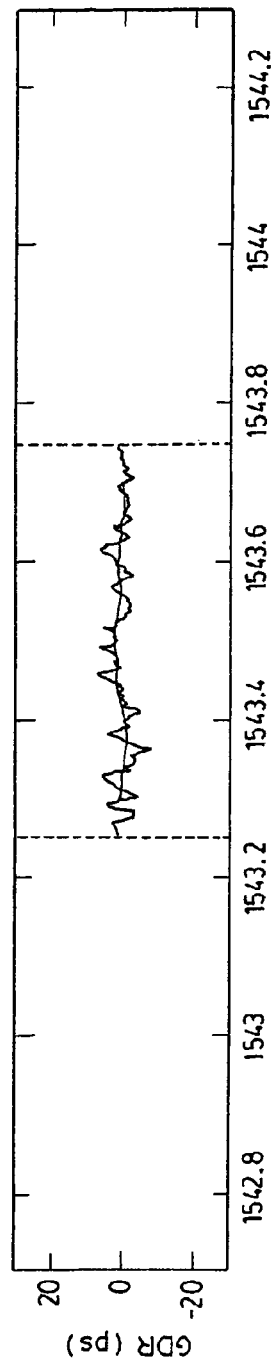
FIG. 3A
FIG. 3B

METHODS FOR IMPROVING THE OPTICAL PROPERTIES OF BRAGG GRATINGS

FIELD OF THE INVENTION

The present invention relates to the making of Bragg gratings and more particularly concerns methods to compensate for defects found in currently manufactured Bragg gratings.

BACKGROUND OF THE INVENTION

Bragg grating technology has been a subject of intensive research for the last decade, especially for its application in the telecommunication industry. Although the optical performance of Bragg gratings is high and extremely attractive for many applications, some problems still persist such as the well known ripples in the group delay spectrum, especially observed in gratings for dispersion compensation.

Various approaches have been used to further improve the optical properties of Bragg gratings, and in particular minimize the group delay ripples (GDR). Bragg gratings are usually made by photoinducing in an optical fiber, or other photosensitive medium, a diffraction pattern, produced by actinic radiation projected through a phase mask. An important source of defects in the resulting grating is the mask itself which usually contains phase errors due to its own manufacturing process. Efforts have therefore been made to improve the quality of phase masks, and therefore reduce the defects in the resulting Bragg gratings. For example, KOMUKAI et al (*"Group delay ripple reduction and reflectivity increase in a chirped fiber Bragg grating by multiple-overwriting of a phase mask with an electron-beam,"* IEEE Photon. Technol. Lett., vol. 12, pp. 816–818 (2000)) discloses a step-chirped phase mask made by overwriting a pattern at the same place on a substrate several times, using an electron-beam in a continuous movement approach. The same authors have also suggested another strategy for fabricating a step-chirped phase mask using a raster scan-type laser-beam writing system (T. Komukai, T. Inui, M. Kurihara, and S. Fujimoto, *"Group-Delay Ripple Reduction in Step-Chirped Fiber Bragg Gratings by Using Laser-Beam Written Step-Chirped Phase Masks,"* IEEE Photon. Technol. Lett., vol. 14, pp. 1554–1556 (2002)). It is notable that, as they modify the masks themselves, both these methods will only correct for mask-related, systematic defects in the resulting gratings.

Instead of trying to minimize or eliminate phase errors in phase masks, another approach is to minimize their effect on the resulting grating, by a proper characterization of the origin of systematic defects in the gratings produced by a given system, and an appropriate feed-back on the fabrication process. Such a technique is for example shown in published U.S. patent application no. 2003/0059164 (STEPHANOV et al.) and A. V. Buryak, and D. Y. Stepanov, *"Correction of systematic errors in the fabrication of fiber Bragg gratings,"* Opt. Lett., vol. 27, pp. 1099–1101 (2002). STEPHANOV et al. discloses a method for compensating for phase errors in a Bragg grating by first making a test grating, and then measuring its spectral characteristics. These characteristics are used to reconstruct the actual design of the grating, preferably using a Layer Peeling Method. A compensated design is obtained by comparing the reconstructed design to the theoretical structure, for example by direct subtraction of deviations therebetween, and the compensated design is finally used to make subsequent gratings using the same optical system. Of course, only systematic defects inherent to the particular optical system used to make the gratings will be compensated for by this method.

Another alternative is to apply a post-treatment to the photoinduced grating. Post-correction of Bragg gratings was already proposed for other purposes, such as tuning the dispersion or other optical characteristics of the grating (see for example K. O. Hill et al. *"Chirped in-fibre Bragg grating dispersion compensators: Linearisation of dispersion characteristic and demonstration of dispersion compensation in 100 km, 10 Gbit/s optical fibre link,"* Electron. Lett., vol. 30, pp. 1755–1756 (1994); and K. O. Hill et al. *"Chirped in-fiber Bragg gratings for compensation of optical-fiber dispersion,"* Opt. Lett., vol. 19, pp. 1314–1316 (1994)). When applied to the correction of defects, this approach has the advantage of alleviating both systematic and non-systematic errors. Referring to published U.S. patent application no. 2003/0186142 (DESHMUKH et al.) and M. Sumetsky et al, *"Reduction of chirped fiber grating group delay ripple penalty through UV post processing,"* Tech. Dig. Post deadline papers, OFC'2003, PD28, there is shown such a technique. The Bragg grating is photoinduced in a photosensitive medium, and a test beam is launched in this medium during, or at the end of the writing process, to optically characterise the grating. The collected data is used to calculate a post-correction to the grating, using a correction algorithm based on a simple solution to the inverse problem relating the measured GDR vs. wavelength to the desired change in Bragg wavelength vs. position. In this approach, only the low frequency part of the GDR is compensated for, which means that the technique only corrects for large defects in the Bragg grating, that is about 10 mm or higher. Several iterations can be made to optimize the benefit of this technique; after the correction is applied, the optical properties of the grating are again measured, and a new correction calculated, this process being repeated until a satisfying suppression of the GDR ripples is achieved.

In spite of all the above-mentioned work, there is still a need for defects-correction techniques having improved optical performances. In particular, there is a need for a technique that takes into consideration any or all of the types of defects found in Bragg gratings and appropriately compensates therefore.

OBJECTS AND SUMMARY OF THE INVENTION

A first object of the present invention is to provide a method for improving the optical characteristics of Bragg gratings by adding a post-correction step in the fabrication procedure.

Another object of the invention is to apply such a post-correction which can successfully correct both systematic and non-systematic errors.

In accordance with the first object of the invention, there is provided a method for improving optical properties of a Bragg grating having a spatial refractive index profile along a propagation axis. The method includes the following steps:

a) Characterising defects of the spatial refractive index profile of the Bragg grating. This characterising includes the sub-steps of:

i. Measuring optical properties of the grating;

ii. Reconstructing the spatial refractive index profile of the grating based on these measured optical properties; and iii. Comparing the reconstructed spatial refractive index profile with a target spatial refractive index profile;

b) Calculating an average index correction to the spatial refractive index profile as a function of the defects characterised in step a); and c) Applying this average index correction to the Bragg grating.

Preferably, the defects characterised in step a) are period defects, apodization defects or both. Although average index defects can also exist, they are virtually undistinguishable from period (or phase) defects and can be ignored.

A second object of the invention is to provide a pre-correction step in the fabrication procedure of the Bragg grating, the correction serving as a feedback to the fabrication process for a series of other gratings in cases where only systematic errors are to be compensated for.

In accordance with this second aspect of the invention, there is therefore also provided a method for making an improved Bragg grating using an optical system generating systematic defects, which includes the steps of:

a) making at least one test Bragg grating using the above-mentioned optical system, which is set up to produce a target spatial refractive index profile;

b) Characterising period defects and apodization defects of said test Bragg grating to respectively obtain a period defects function $\delta p(z)$ and an apodization defects function $\delta_n(z)$;

c) Calculating an average index correction to the target spatial refractive index profile as a function of the period and apodization defects functions;

d) Calculating a corrected spatial refractive index profile using the average index correction; and e) Making the improved Bragg grating using the optical system, set up to produce the corrected spatial refractive index profile.

In either case, the correction can advantageously be applied to sophisticated gratings such as multi-channel gratings or low-dispersion WDM Bragg gratings, as well as simple single-channel apodized gratings. For multi-channel gratings, only the defects affecting all the channels may be corrected for.

Further features and advantages of the present invention will be better understood upon reading of preferred embodiments thereof with reference to the appended drawings.

BRIEF DESCRIPTION OF THE DRAWINGS

FIGS. 3A and 3B are graphical representations of Group Delay Ripples as a function of wavelength for a dispersion compensation grating having a dispersion of −850 ps/nm, respectively before and after the application of a post-correction according to a preferred embodiment of the present invention.

DESCRIPTION OF PREFERRED EMBODIMENTS OF THE INVENTION

Figure 1A:
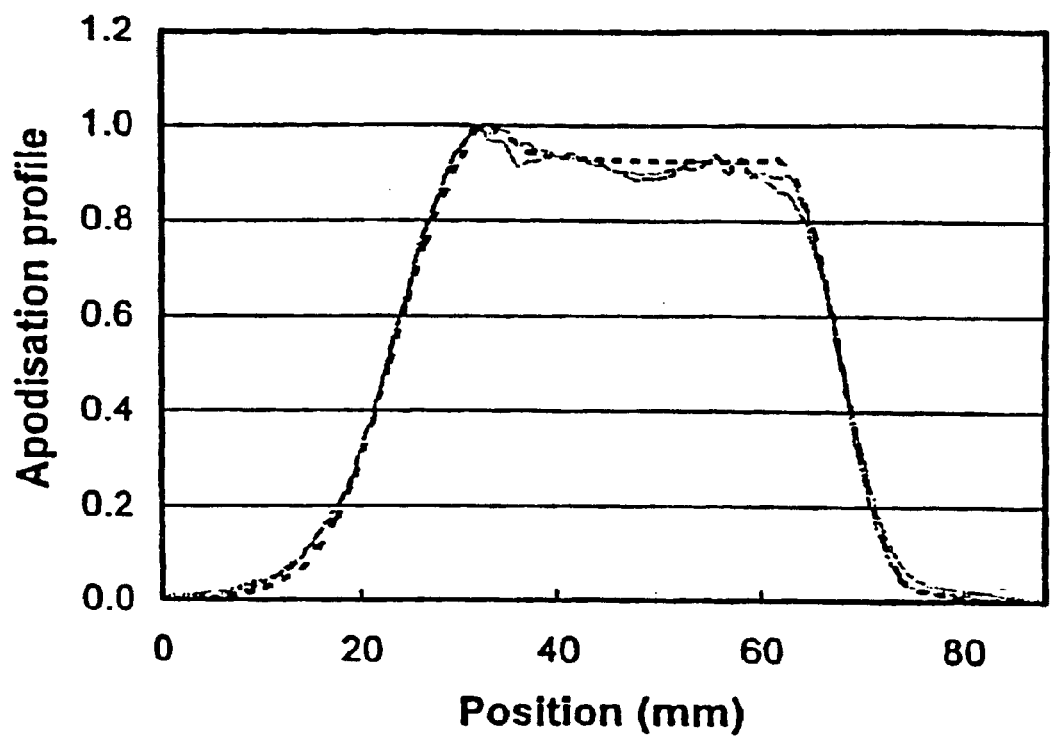
FIGS. 1A and 1B are graphical representations of the apodisation and period profiles, respectively, obtained from a Layer Peeling reconstruction in comparison with the theoretical profiles (dotted lines).

The present invention provides methods for improving the optical properties of Bragg gratings in general, by calculating and applying an average index correction which compensates for defects in the gratings. To better understand the principles of the invention, it is relevant to define and mathematically describe what is understood by "defects" in the grating.

By definition, a Bragg grating consists of a modulation of the index of refraction along a propagation axis of a waveguide. In telecommunications applications the waveguide is usually a length of optical fiber, but it is understood that the present invention may be embodied in a planar waveguide or any other forms of optical medium in which a light beam may be guided. Throughout the description below, the propagation axis is denoted as the z axis but it will be readily understood that it is simply a convenient label.

A Bragg grating can be modelled generally as:

$$n_0(z) = n_{\it{eff0}}(z) + \Delta n_0(z) \cdot \sin(\phi_0(z)), \tag{1}$$

where $n_{\it{eff0}}(z)$ is the average effective index of the medium, $\Delta n_0(z)$ is the index modulation (or "apodization" profile) and $\phi_0(z)$ represents the absolute phase profile of the grating. The profile $n_{\it{eff0}}(z)$ is qualified of "average index" even if it is a spatially dependent function, as it contains no short-period modulation; it is considered to vary slowly along z, the term "average" being understood to be on a spatial scale of the grating fringes.

Alternatively, Equation (1) can be written as:

$$n_0(z) = n_{\it{eff0}}(z) + \Delta n_0(z) \cdot \sin\left(\frac{2\pi}{p_{av}} \cdot z + \Delta\phi_0(z)\right), \tag{2}$$

where $p_{av}$ represents the average period and $\Delta\phi_0(z)$ is the phase of the grating which describes the variations of the period with respect to its average value $p_{av}$. It is assumed that $\Delta\phi_0(z)$ is a slowly varying function, or in other words, that $\phi_0(z)$ in equation (1) is approximately a linear function of z. Although the representation of a grating by Equation (2) is widely found in the literature, the representation by Equation (1) will be preferred in this document, as the use of the absolute phase $\phi_0(z)$ is more convenient to describe the principles of the present invention.

The local period $p_0(z)$ of the grating is defined as the distance along the propagation axis of the grating over which a phase difference $2\pi$ exists. In other words, the local period $p_0(z)$ is defined as:

$$p_0(z) \equiv 2\pi \left(\frac{d\,\phi_0(z)}{dz}\right)^{-1}. \quad (3)$$

It will be noted that in Equations (1) to (3), as well as throughout the present description, the indices 0 are not related to some point of origin, but refer to perfect or ideal quantities, that is, what these quantities would be if the grating had no defects.

An imperfect grating that contains defects can be modelled as:

$$n(z) = n_{\mathit{eff}}(z) + \Delta n(z) \cdot \sin(\phi(z)), \quad (4)$$

where $n_{\mathit{eff}}(z) = n_{\mathit{eff}0}(z) + \delta n_{\mathit{eff}}(z),$ (5)

$\Delta n(z) = \Delta n_0(z) \cdot (1 + \delta_n(z)),$ (6)

$\phi(z) = \phi_0(z) + \delta\phi(z),$ (7)

and where $\delta n_{\mathit{eff}}(z)$, $\delta_n(z)$ and $\delta\phi(z)$ are functions representing the local average index defects, apodisation (or modulation index) defects and phase defects, respectively. To improve the optical properties of an imperfect grating, one must therefore minimize or negate the effect of these three terms on the refractive index profile of the grating.

To change the optical properties of a Bragg grating, one may either effect a post-correction, that is an additional processing of an already written grating, or a pre-correction, which involves using the measured properties of a test grating to modify the writing set up to improve subsequent gratings obtained therewith. In the case of a post-correction, the grating phase profile can not be modified, that is, the physical locations where clear and dark fringes are along the grating axis can not be changed. It is therefore not possible to change $\phi(z)$. The apodisation profile, that is $\Delta n(z)$ could be modified by superimposing a correction grating to the already written grating but this approach is difficult to successfully achieve. Only the direct modification of the average index $n_{\mathit{eff}}(z)$ is easy to realize. It is therefore advantageous to calculate an average index correction taking into account the three types of defects of the grating, giving the final grating profile:

$$n(z) = n_{\mathit{eff}}(z) + \Delta n(z) \cdot \sin(\phi(z)) + \Delta n_{\mathit{eff\_tc}}(z). \quad (8)$$

The correction to be calculated is therefore an average index function $\Delta n_{\mathit{eff\_tc}}(z)$. As expressed by Equation (4), three kinds of defects have to be considered to completely model a Bragg grating: the average index, phase, and apodisation defects. It will be shown below that an average index correction function can be calculated for each of them. It is assumed that an appropriate total correction function $\Delta n_{\mathit{eff\_tc}}(z)$ is obtained by summing the corrections calculated for each kind of defect:

$$\Delta n_{\mathit{eff\_tc}}(z) = \Delta n_{\mathit{eff\_cn}}(z) + \Delta n_{\mathit{eff\_cp}}(z) + \Delta n_{\mathit{eff\_ca}}(z) + \Delta n_{\mathit{eff\_offset}}, \quad (9)$$

where $\Delta n_{\mathit{eff\_cn}}(z)$, $\Delta n_{\mathit{eff\_cp}}(z)$ and $\Delta n_{\mathit{eff\_ca}}(z)$ are the correction functions associated with the average index, phase and apodisation defects respectively, and where $\Delta n_{\mathit{eff\_offset}}$ is a uniform index change offset that renders the correction function $\Delta n_{\mathit{eff\_tc}}(z)$ strictly positive for all positions, while $\Delta n_{\mathit{eff\_cn}}(z)$, $\Delta n_{\mathit{eff\_cp}}(z)$ and $\Delta n_{\mathit{eff\_ca}}(z)$ could be negative at some points. It will be understood that for post-correction of the grating the total correction function has to be positive in order to be physically applicable, due to the nature of the photosensitivity that causes an increase of the refractive index. In the case of a pre-correction, the total correction function could be negative and the offset term could be omitted.

Correction of the Average Index Defects

A grating that contains only average index defects can be modelled as:

$$n(z) = n_{\mathit{eff}0}(z) + \delta n_{\mathit{eff}}(z) + \Delta n_0(z) \cdot \sin(\phi_0(z)). \quad (10)$$

The average index correction function $\Delta n_{\mathit{eff\_cn}}(z)$ is simply the one that nulls the local average index defects $\delta n_{\mathit{eff}}(z)$:

$$\Delta n_{\mathit{eff\_cn}}(z) = -\delta n_{\mathit{eff}}(z). \quad (11)$$

Correction of the Phase Defects

A grating that contains only phase defects can be modelled as:

$$n(z) = n_{\mathit{eff}0}(z) + \Delta n_0(z) \cdot \sin(\phi_0(z) + \delta\phi(z)), \quad (12)$$

where $\delta\phi(z)$ is the phase defects function. The relationship between the local period $p(z)$ and the absolute phase, as expressed by Equation (3), becomes in this particular case:

$$p(z) = 2\pi \left(\frac{d}{dz}(\phi_0(z) + \delta\phi(z))\right)^{-1}. \quad (13)$$

Due to the phase defects $\delta\phi(z)$, the period profile is different from the ideal profile $p_0(z)$ by a certain quantity $\delta p(z)$:

$$p(z) = p_0(z) + \delta p(z). \quad (14)$$

Assuming that the spatial variation of $\delta\phi(z)$ is small compared to the spatial variation of $\phi_0(z)$, the combination of Equations (3), (13) and (14) yields a period defects function $\delta p(z)$ given by:

$$\delta p(z) = -\frac{p_0^2(z)}{2\pi} \cdot \frac{d}{dz}(\delta\phi(z)). \quad (15)$$

Thus, there is equivalence between phase errors and period errors, which is explicitly expressed by Equation (15).

There is also equivalence between period and average index errors. Indeed, the local optical period length, that is, the product of the local values of period and average index, is the parameter that affects the optical properties. Two different gratings for which, at each point, the product of the period by the average index is the same, will virtually have the same optical characteristics. As an example, from the spectral characteristics, a Layer Peeling algorithm can not distinguish between period and average index fluctuations. Using such a reconstruction algorithm, all the fluctuations are attributed to the period and the average index is assumed to be uniform along the grating.

Accordingly, a grating that contains period errors $\delta p(z)$ behaves as a grating that contains average index errors $\Delta n_{\mathit{eff\_p}}(z)$ if, at each point, their optical period lengths are the same, that is:

$$p_0(z) \cdot (n_{\mathit{eff}0}(z) + \Delta n_{\mathit{eff\_p}}(z)) = (p_0(z) + \delta p(z)) \cdot n_{\mathit{eff}0}(z). \quad (16)$$

In other words, index errors $\Delta n_{\mathit{eff\_p}}(z)$ and period errors $\delta p(z)$ are equivalent if they satisfy:

$$\frac{\Delta n_{\mathit{eff\_p}}(z)}{n_{\mathit{eff}\,0}(z)} = \frac{\delta p(z)}{p_0(z)}. \tag{17}$$

Therefore, an average index correction function $\Delta n_{\mathit{eff\_cp}}(z)$ nulls the period errors $\delta p(z)$ (or phase errors $\delta\phi(z)$) if it satisfies:

$$\Delta n_{\mathit{eff\_cp}}(z) = \tag{18}$$
$$-\Delta n_{\mathit{eff\_p}}(z) = -\frac{n_{\mathit{eff}\,0}(z)}{p_0(z)} \cdot \delta p(z) = n_{\mathit{eff}\,0}(z) \cdot \frac{p_0(z)}{2\pi} \cdot \frac{d}{dz}(\delta\phi(z)).$$

A period correction function $\Delta n_{\mathit{eff\_cp}}(z)$, that is, an average index correction as a function of the period or phase defects can therefore be calculated using equation (18) above.

Correction of the Apodization Defects

The correction of apodisation defects using an average index correction function is less straightforward than the other two kinds of defects and preferably involves an analysis of the apodization defect function in the frequency domain.

A grating that contains only apodisation defects can be modelled as:

$$n(z) = n_{\mathit{eff}\,0}(z) + \Delta n_0(z) \cdot (1 + \delta_n(z)) \cdot \sin(\phi_0(z)), \tag{19}$$

where $\delta_n(z)$ is the apodization defects function. Using a frequency domain analysis, $\delta_n(z)$ can be written as the sum of periodic error components:

$$\delta_n(z) = \int_0^\infty (A_c(\alpha)\cos(\alpha z) + A_s(\alpha)\sin(\alpha z))\,d\alpha, \tag{20}$$

where $A_c(\alpha)$ and $A_s(\alpha)$ are Fourier coefficients.

Combining Equations (19) and (20) yields to:

$$n(z) = n_{\mathit{eff}\,0}(z) + \Delta n_0(z)\cdot\sin(\phi_0(z)) + \Delta n_b(z) + \Delta n_r(z), \tag{21}$$

where $$\Delta n_b(z) = \int_0^\infty \left(\frac{\Delta n_0(z)\cdot A_c(\alpha)}{2}\cdot\sin(\phi_0(z)+\alpha z) - \frac{\Delta n_0(z)\cdot A_s(\alpha)}{2}\cdot\cos(\phi_0(z)+\alpha z)\right)d\alpha, \tag{22}$$

$$\Delta n_r(z) = \int_0^\infty \left(\frac{\Delta n_0(z)\cdot A_c(\alpha)}{2}\cdot\sin(\phi_0(z)-\alpha z) + \frac{\Delta n_0(z)\cdot A_s(\alpha)}{2}\cdot\cos(\phi_0(z)-\alpha z)\right)d\alpha. \tag{23}$$

In Equation (21), the first two terms on the right side represent the ideal grating, while $\Delta n_b(z)$ and $\Delta n_r(z)$ contain information about the defects (through the Fourier coefficients $A_c(\alpha)$ and $A_s(\alpha)$) and behave as parasitic gratings, respectively at the blue and red sides of the spectrum with respect to the ideal reflection of the grating.

Figure 2:
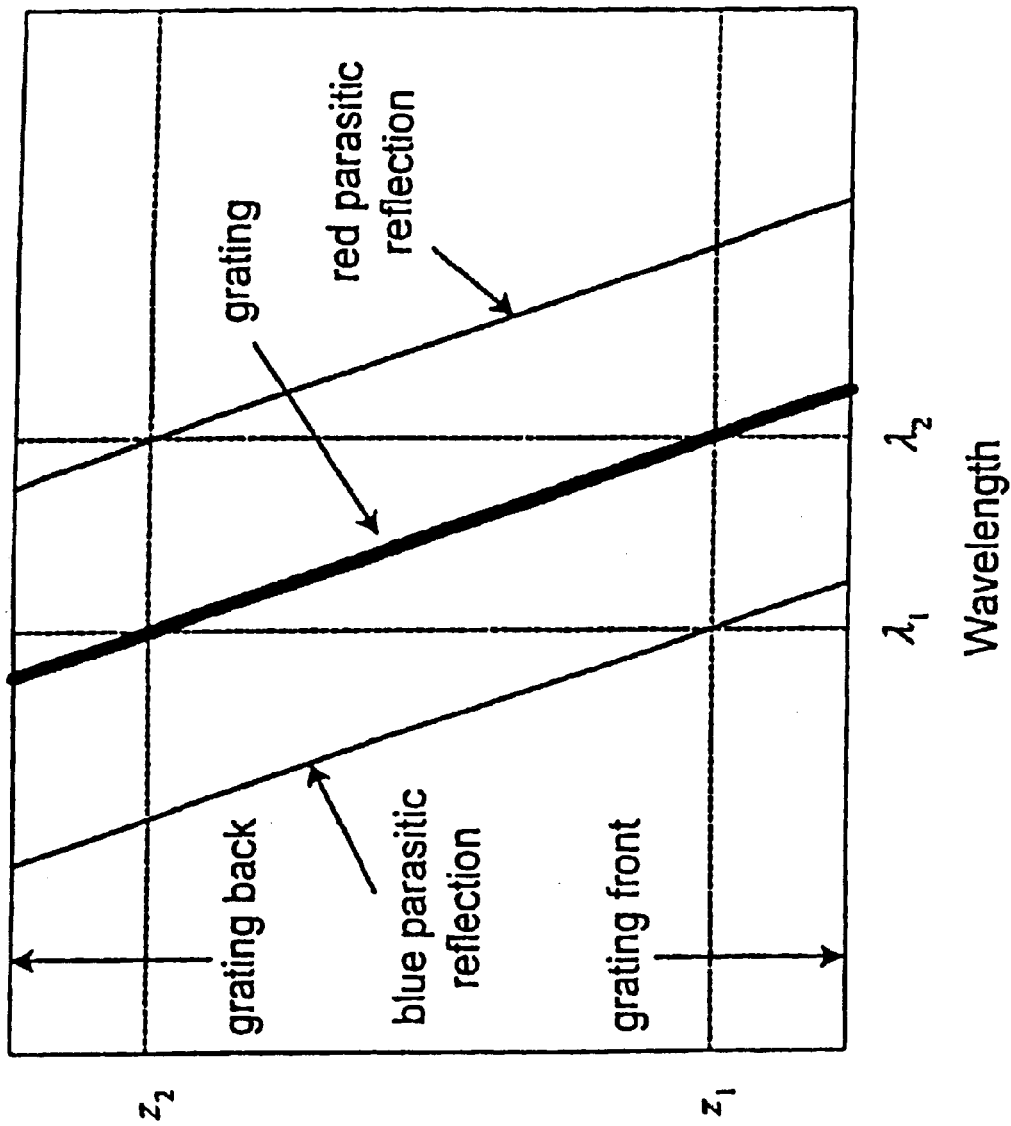
FIG. 2 (PRIOR ART) is a graphical representation of the central reflection location as a function of the wavelength for the grating and for single-frequency parasitic reflections.
Figure 4A:
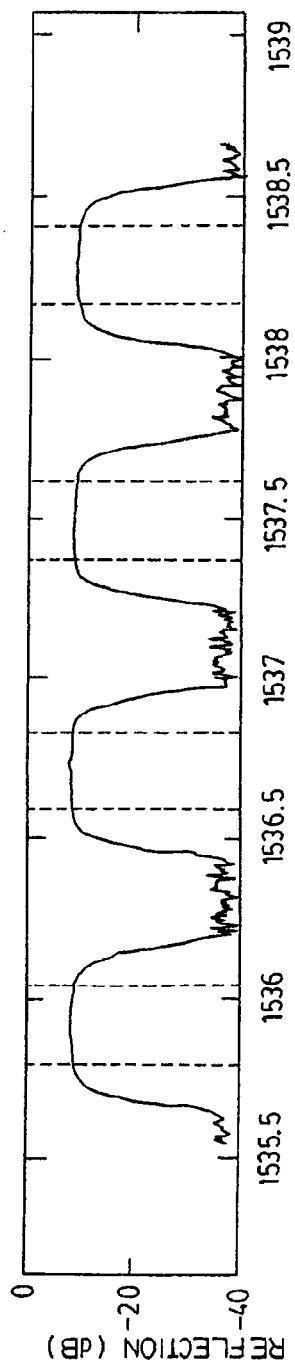
FIGS. 4A to 4D respectively show the reflection spectrum (dB), transmission spectrum (dB), group delay (ps) and GDR as a function of wavelength of a 4-channel dispersion compensation grating made using a non-corrected target period profile.
Figure 4B:
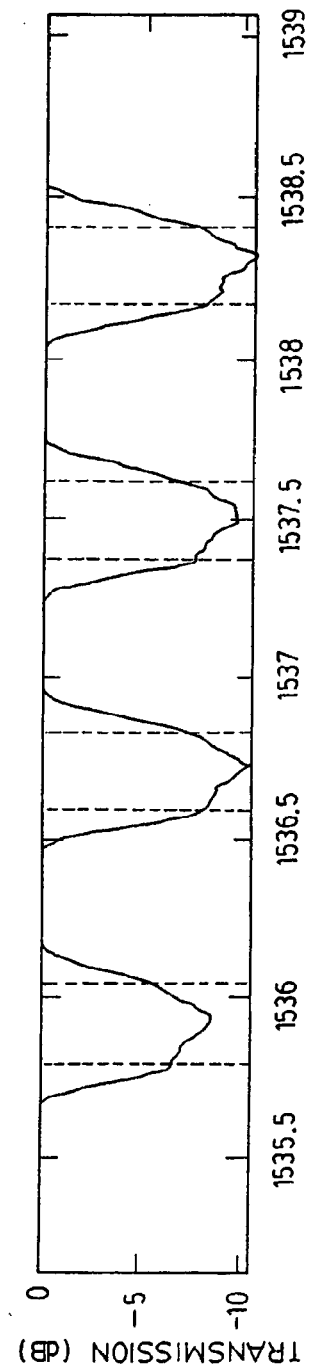
Figure 4C:
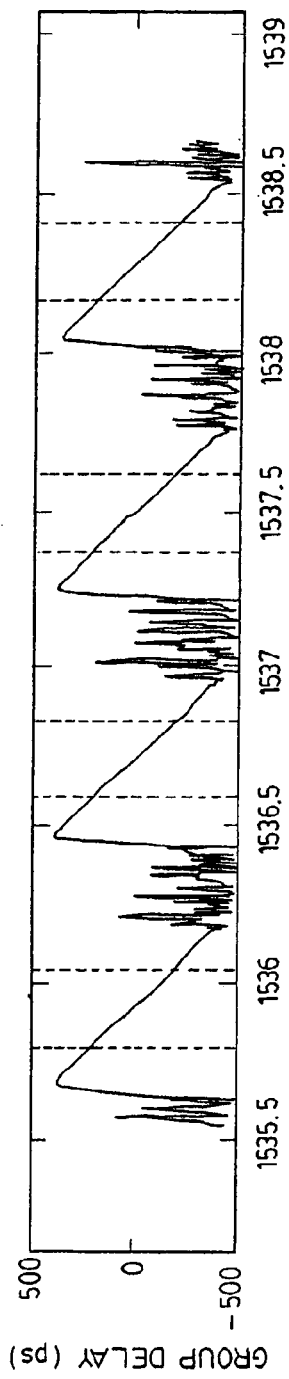
Figure 4D:
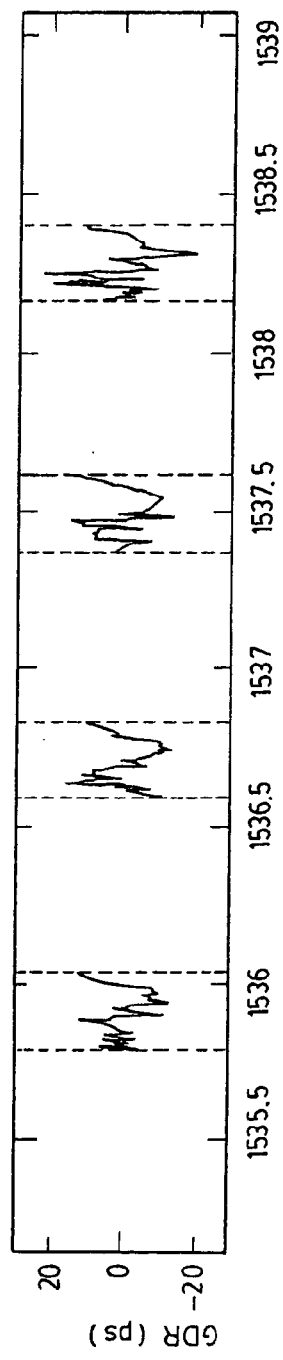
Figure 5A:
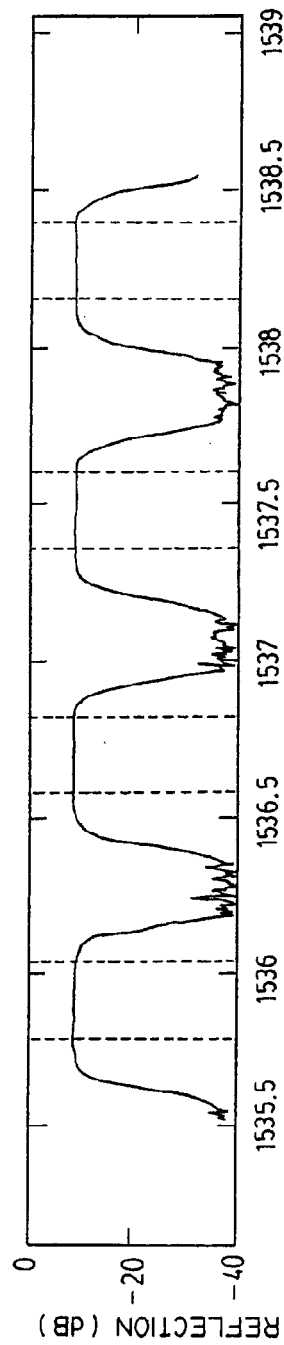
FIGS. 5A to 5D respectively show the reflection spectrum (dB), transmission spectrum (dB), group delay (ps) and GDR as a function of wavelength of a 4-channel dispersion compensation grating made using a corrected target period profile according to another preferred embodiment of the invention.
Figure 5B:
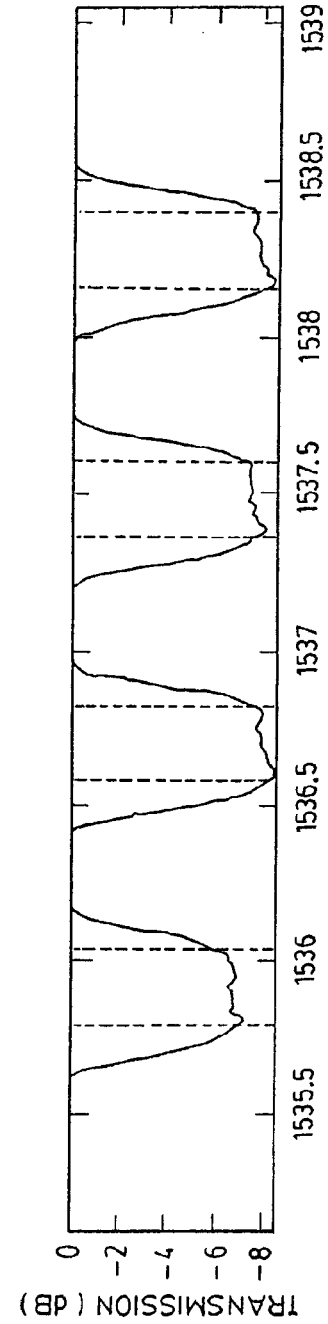
Figure 5C:
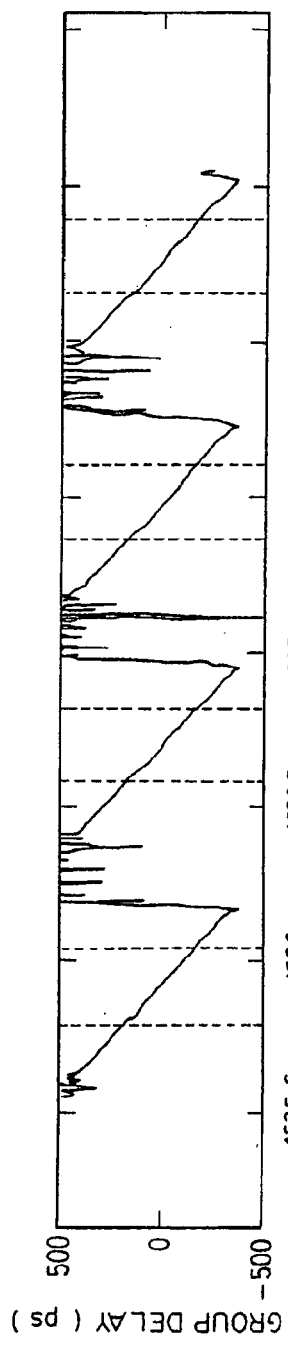
Figure 5D:
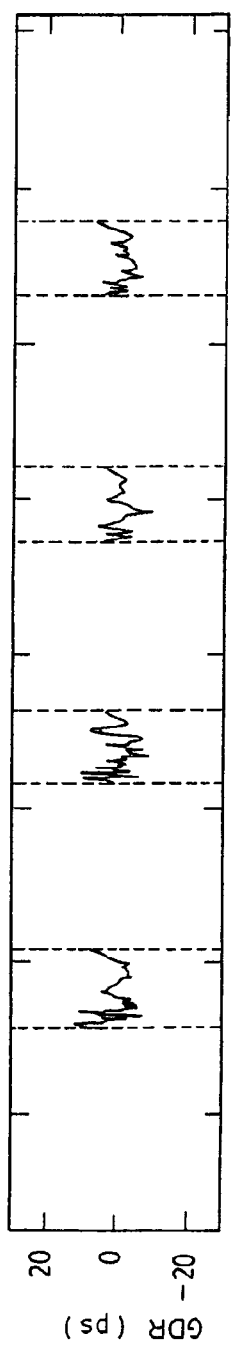

Examples of such parasitic reflections are represented in FIG. 2 (PRIOR ART) in the case of a linearly chirped grating. In FIG. 2, the position $z_1$, corresponds to the grating front while $z_2$ corresponds to the grating back and accordingly the grating provides a negative dispersion. As illustrated, the light of wavelength $\lambda_1$ coming from the grating input is partly reflected at point $z_1$ by the blue side parasitic grating, while the main reflection occurs at $z_2$ near the back of the grating. Such a parasitic reflection affects the performances of the grating. The light of wavelength $\lambda_2$ is reflected at location $z_1$, and by the red side parasitic grating at $z_2$. Since a large part of the light has already been reflected at $z_1$, especially if the grating is strongly reflective, the parasitic reflection at $z_2$ has less effect when compared to what occurs at wavelength $\lambda_1$. Thus, the front parasitic reflection, in this case at the blue side, is worse than the back parasitic reflection at the red side. Oppositely, the parasitic reflection at the red side is worse than the parasitic reflection at the blue side when the grating provides a positive dispersion, that is, when $z_2$ corresponds rather to the grating front and $z_1$ to the back.

The blue parasitic reflection can be nulled by a proper phase correction function $\delta\phi_a(z)$. It will be noted that $\delta\phi_a(z)$ is a working parameter corresponding to a hypothetical correction to the ideal phase function $\delta_0(z)$, and has no relation to the phase error function $\delta\phi(z)$ which is based on actual measurements of the grating. With such a correction, Equation (19) becomes:

$$n(z) = n_{\mathit{eff}\,0}(z) + \Delta n_0(z)\cdot(1+\delta_n(z))\cdot\sin(\phi_0(z)+\delta\phi_a(z)). \tag{24}$$

Assuming that $\delta\phi_a(z) \ll 1$, Equation (24) reduces to:

$$n(z) = n_{\mathit{eff}\,0}(z) + \Delta n_0(z)\sin(\phi_0(z)) + \Delta n_0(z)\delta_n(z)\sin(\phi_0(z)) + \Delta n_0(z)\delta\phi_a(z)\cos(\phi_0(z)). \tag{25}$$

As was the case for the defect function $\delta_n(z)$, given by equation (20), the phase correction function $\delta\phi_a(z)$ can be expressed as Fourier spectra, that is:

$$\delta\phi_a(z) = \int_0^\infty (B_c(\alpha)\cos(\alpha z) + B_s(\alpha)\sin(\alpha z))\,d\alpha. \tag{26}$$

Combining Equations (20), (25) and (26), one obtains:

$$n(z) = n_{\mathit{eff}\,0}(z) + \Delta n_0(z)\cdot\sin(\phi_0(z)) + \Delta n_b(z) + \Delta n_r(z), \tag{27}$$

where $$\Delta n_b(z) = \int_0^\infty \left( \begin{array}{l} \frac{\Delta n_0(z)\cdot A_c(\alpha)}{2}\cdot\sin(\phi_0(z)+\alpha z) - \frac{\Delta n_0(z)\cdot A_s(\alpha)}{2}\cdot\cos(\phi_0(z)+\alpha z) + \\ \frac{\Delta n_0(z)\cdot B_c(\alpha)}{2}\cdot\cos(\phi_0(z)+\alpha z) + \frac{\Delta n_0(z)\cdot B_s(\alpha)}{2}\cdot\sin(\phi_0(z)+\alpha z) \end{array} \right) d\alpha, \tag{28}$$

-continued $$\Delta n_r(z) = \int_0^\infty \left( \begin{array}{c} \frac{\Delta n_0(z) \cdot A_c(\alpha)}{2} \cdot \sin(\phi_0(z) - \alpha z) + \frac{\Delta n_0(z) \cdot A_s(\alpha)}{2} \cdot \cos(\phi_0(z) - \alpha z) \Big) + \\ \frac{\Delta n_0(z) \cdot B_c(\alpha)}{2} \cdot \cos(\phi_0(z) - \alpha z) - \frac{\Delta n_0(z) \cdot B_s(\alpha)}{2} \cdot \sin(\phi_0(z) - \alpha z) \end{array} \right) d\alpha. \tag{29}$$

The blue parasitic reflection can therefore be eliminated by adding a phase correction function $\delta\phi_a(z)$ such that, for all values of $\alpha$:

$$B_c(\alpha) = A_s(\alpha), \tag{30}$$

$$B_s(\alpha) = -A_c(\alpha). \tag{31}$$

As developed in the previous section (Equations (15) and (17)), a phase correction function $\delta\phi_a(z)$ is equivalent to an average index correction function $\Delta n_{eff\_ca}(z)$ given by:

$$\Delta n_{\text{eff\_ca}}(z) = -n_{eff0}(z) \cdot \frac{p_0(z)}{2\pi} \cdot \frac{d}{dz}(\delta\phi_a(z)). \tag{32}$$

Alternatively, $\Delta n_{eff\_ca}(z)$ can be expressed as a function of a period correction function $\delta p_a(z)$:

$$\Delta n_{\text{eff\_ca}}(z) = \frac{n_{eff0}(z)}{p_0(z)} \cdot \delta p_a(z), \tag{33}$$

where $\delta p_a(z)$ is defined as:

$$\delta p_a(z) = -\frac{p_0^2(z)}{2\pi} \frac{d}{dz}(\delta\phi_a(z)). \tag{34}$$

Finally, combining Equations (26), (30), (31) and (32), $\Delta n_{eff\_ca}(z)$ can be expressed as a function of the Fourier coefficients of $\delta_n(z)$, that is $A_c(\alpha)$ and $A_s(\alpha)$ which are defined by Equation (20), so that one obtains:

$$\Delta n_{\text{eff\_ca}}(z) = \frac{n_{eff0}(z) \cdot p_0(z)}{2\pi} \int_0^\infty (A_c(\alpha)\cos(\alpha z) + A_s(\alpha)\sin(\alpha z))\alpha d\alpha. \tag{35}$$

Equation (35) therefore gives an average index correction compensating for the blue parasitic reflection, depending on the apodization defects function $\delta_n(z)$, through the Fourier coefficients $A_c(\alpha)$ and $A_s(\alpha)$.

In cases where the red parasitic reflection needs to be compensated for, it can be seen from equation (29) that the signs on the Fourier coefficients given by equations (30) and (31) need to be reversed to properly null the term $\Delta n_r(z)$. This simply has the effect of changing the sign of the apodization correction function $\Delta n_{eff\_ca}(z)$, which therefore becomes:

$$\Delta n_{\text{eff\_ca}}(z) = -\frac{n_{eff0}(z) \cdot p_0(z)}{2\pi} \int_0^\infty (A_c(\alpha)\cos(\alpha z) + A_s(\alpha)\sin(\alpha z))\alpha d\alpha. \tag{36}$$

Post-Correction of the Defects

Based on the principles above, a first embodiment of the present invention therefore provides a post-correction method for improving optical properties of a Bragg grating using only an average index correction.

The first step a) of this method involves characterising the phase defects, the apodization defects or both in the spatial refractive index profile of the Bragg grating. Since this particular embodiment refers to a correction post-writing, it is understood that the grating has already been photoinduced in an appropriate photosensitive medium, and can therefore be characterised spectrally. Optical properties of the grating are obtained, using routine measuring techniques. For example, any spectrum of the reflection, transmission, group delay either in reflection or transmission may be obtained, from either extremity of the grating or both. Preferably, at least one reflectivity spectrum and one group delay spectrum in reflection are measured. The spatial refractive index profile of the grating is then reconstructed, based on the measured optical properties. This is preferably achieved through the use of a reconstruction algorithm such as the Layer Peeling Method (see R. Feced, M. N. Zervas, and M. A. Muriel, "*An efficient inverse scattering algorithm for the design of nonuniform fiber Bragg gratings,*" IEEE J. Quantum Electron., vol. 35, pp. 1105–1115 (1999), and J. Skaar, L. Wang, and T. Erdogan, "*On the synthesis of fiber Bragg gratings by layer peeling,*" IEEE J. Quantum Electron., vol. 37, pp. 165–173 (2001)). Other characterization techniques based on direct measurement of the apodisation and phase profiles can be used as well (see P. A. Krug, R. Stolte, and R. Ulrich, "*Measurement of index modulation along an optical fiber Bragg grating,*" Opt. Lett., vol. 20, pp. 1767–1769 (1995); M. Aslund, J. Canning, and L. Poladian, "*Novel characterization technique with 0.5 ppm spatial accuracy of fringe period in Bragg gratings,*" Opt. Express, vol. 11, pp. 838–842 (2003).

Figure 1B:
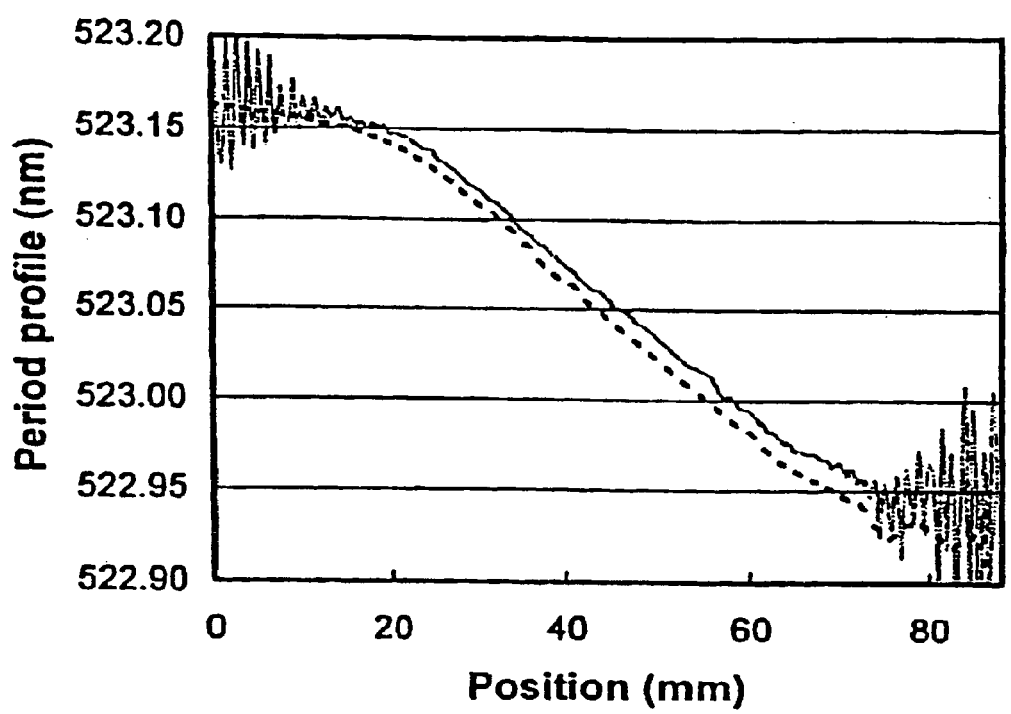

Referring to FIGS. 1A and 1B, an example of such a grating characterization using this technique is shown in the case of a dispersion compensation grating. Apodisation (FIG. 1A) and period (FIG. 1B) profiles obtained from a Layer Peeling reconstruction of the refractive index profile are illustrated in comparison with the theoretical profiles (dotted lines—a small offset has been added to the curve of FIG. 1B to better see the differences between the superposed profiles). It can be seen that both profiles are very close to the theoretical curves. Also shown in FIGS. 1A and 1B are the respective profiles' reconstructions from the data taken from both grating ends. Very similar results are obtained which is an indication that the reconstructed profiles properly describe the grating. In such a case, the profile from either ends may be used to characterize the defects. In the alternative, a properly weighted combination of the profiles from both ends could be computed as the final reconstructed profile.

The fluctuations of the reconstructed apodization profile from the theoretical curve correspond to the apodization defects function $\delta_n(z)$ and the differences in the theoretical and reconstructed period profiles give the period defects function $\delta p(z)$. The error function on the average index $\delta n_{\it eff}(z)$ is not characterised with this technique and is assumed to be zero. This assumption comes from the virtual redundancy that exists between the phase and average index errors as explained above.

Once the defects have been properly characterised, and the defects functions $\delta_n(z)$ or $\delta p(z)$ or both are obtained, a second step b) of calculating an average index correction $\Delta n_{\it eff\_tc}(z)$ to the spatial refractive index profile of the grating is performed. The average index correction depends on at least one of the two kinds of defects $\delta_n(z)$ and $\delta p(z)$, as obtained in step a), through appropriate correction functions $\Delta n_{\it eff\_cp}(z)$ and $\Delta n_{\it eff\_ca}(z)$. In cases where both types of defects are considered, the average index correction $\Delta n_{\it eff\_tc}(z)$ is a sum of $\Delta n_{\it eff\_cp}(z)$ and $\Delta n_{\it eff\_ca}(z)$. An offset term $\Delta n_{\it eff\_offset}$ is added when necessary to the average index correction $\Delta n_{\it eff\_tc}(z)$ to render it positive for all values of z.

Preferably, based on the principles explained above, when needed the period correction function $\Delta n_{\it eff\_cp}(z)$ is given by equation (18), repeated here for convenience:

$$\Delta n_{\text{eff\_cp}}(z) = -\frac{n_{\it eff0}(z)}{p_0(z)} \cdot \delta p(z), \qquad (37)$$

where z is the propagation axis of the grating, $n_{\it eff0}(z)$ is the target average effective index and $p_0(z)$ is the target local period.

Again, as previously explained, when the apodization correction function $\Delta n_{\it eff\_ca}(z)$ is needed, a frequency domain analysis of the apodization defects function is preferably performed. An apodization correction function $\Delta n_{\it eff\_ca}(z)$ is calculated to compensate for a front parasitic reflection in the frequency domain, which may be on the blue or red side of the ideal reflection from the grating depending on the sign of the grating dispersion. The result of this analysis is an apodization correction function taking the form of equation (35) or (36):

$$\Delta n_{\text{eff\_ca}}(z) = \pm \frac{n_{\it eff0}(z) \cdot p_0(z)}{2\pi} \int_0^\infty (A_c(\alpha)\cos(\alpha z) + A_s(\alpha)\sin(\alpha z))\alpha d\alpha, \qquad (38)$$

where z is the propagation axis of the grating, $n_{\it eff0}(z)$ is the target average effective index, $p_0(z)$ is the target local period and $A_s(\alpha)$ and $A_c(\alpha)$ are Fourier coefficients of said frequency domain analysis. The positive sign applies in the case of a negative grating dispersion, and the negative sign for a positive grating dispersion.

The last step of the method according to the present embodiment consist of c) applying the average index correction to the grating. The average index correction is photoinduced in the photosensitive medium over the Bragg grating, preferably by exposing the grating to a spatially variable dose of UV light along its propagation axis.

Figure 6:
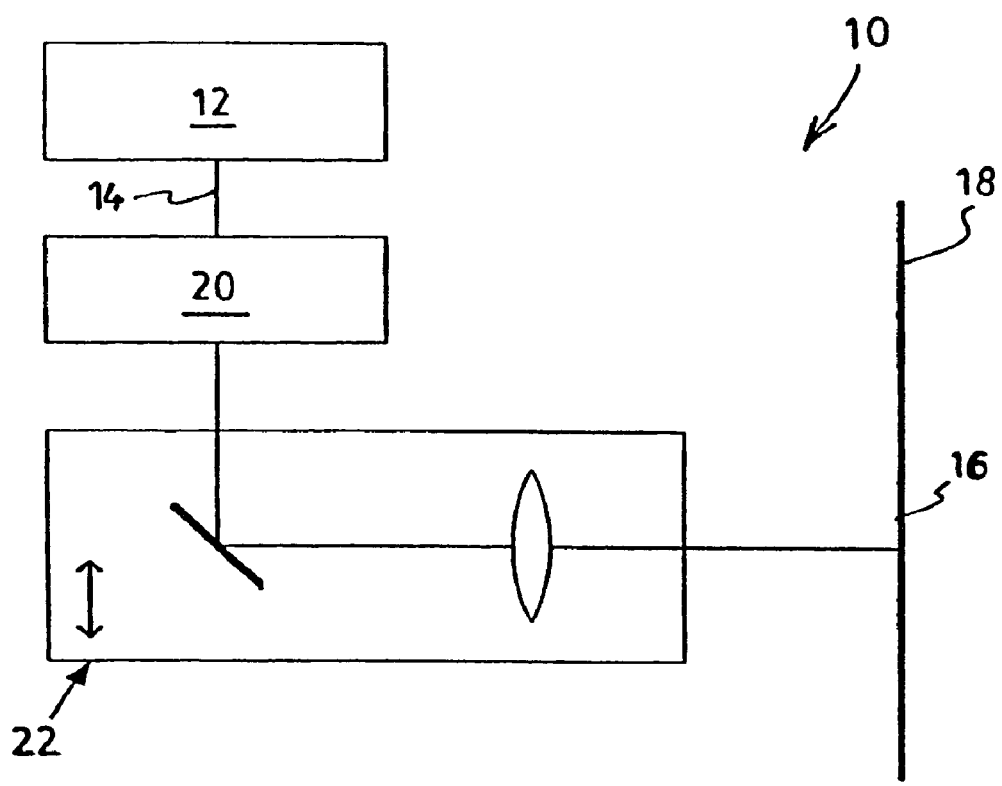
FIG. 6 is a schematic representation of an optical system for applying an average index correction to a Bragg grating according to a preferred embodiment of the invention.

Referring to FIG. 6, an example of an optical system 10 to perform this operation is shown. The optical system 10 includes a light source 12 generating actinic radiation, preferably in the form of a UV light beam 14. The light beam impinges transversally on the Bragg grating 16, photoinduced in an optical fiber 18, and is scanned along its propagation axis. In the illustrated embodiment, this is achieved by appropriate re-directing and shaping optical components mounted on a translation stage 22, but of course any appropriate scanning assembly could be used. To create the proper UV profile as dictated by the calculated average index correction, the intensity of the UV light beam 14 is varied during the scanning preferably using a variable optical attenuator 20. Any alternative methods to vary the strength of the photoinduced profile may also be used, such as varying the scanning speed of the beam 14, moving the fiber 18 instead of, or in combination with, the scanning of the light beam, etc.

It is also understood that the optical system of FIG. 6 is illustrated by way of example and that any other set-up allowing to photoinduce a variable average index profile could alternatively be used. For example, the average index correction could be applied using the same optical system used to make the Bragg grating in the first place. Preferably, such a system includes a phase mask in the path of the light beam, diffracting the beam to generate the interference fringes of the grating (see for example U.S. Pat. No. 5,367,588 (HILL et al)). The application of the correction however does not require any phase mask, as no fringes have to be written in the photosensitive medium but rather only an average index change. Instead of removing the phase mask, it can remain in place for convenience but the fringes it produces can be washed out by vibrating the phase mask (see M. J. Cole et al, "Moving fibre/phase mask-scanning beam technique for enhanced flexibility in producing fibre gratings with uniform phase mask," Electron. Lett., pp.1488–1490 (1995)), or by using a curvature in the wavefront of the UV beam (as for example explained in U.S. Pat. No. 6,501,883 (PAINCHAUD et al)).

Pre-Correction of the Defects

In accordance with another aspect of the present invention, the post-correction described in the previous section can be replaced by a pre-correction when the grating defects are found to be systematic from grating to grating. In this case, one or many test gratings are made and serve to characterise the defects and allow calculating a correction. Then, the fabrication procedure is adapted according to the calculated correction.

In accordance with a preferred embodiment for such a pre-correction, there is provided a method for making an improved Bragg grating using an optical system generating systematic defects, which includes the following steps of:

a) making at least one test Bragg grating using this optical system. The system is set up to produce a target spatial refractive index profile such as the ideal profile given by equation (1).

b) Characterising period defects and apodization defects of the test Bragg grating, to respectively obtain a period defects function $\delta p(z)$ and an apodization defects function $\delta_n(z)$. The reconstruction technique explained above may be used, but the present invention is not limited to such a technique. It is understood that although data from a single grating may be sufficient to properly characterise the systematic defects generated by the optical system it can also be advantageous to use several gratings and compare their results to obtain this information.

c) Calculating an average index correction to the target spatial refractive index profile, as a function of the period and apodization defects functions. Preferably, the calculations developed above resulting in equations (37) and (38) are used.

d) Calculating a corrected spatial refractive index profile using said average index correction; and e) Making the improved Bragg grating using the optical system set up to produce the corrected spatial refractive index profile.

The fabrication procedure can include the average index correction function given by Equation (9) directly as the grating is written, avoiding the need of an additional post-correction step. Alternatively, for an easier fabrication, the correction can also be applied on the period profile of the grating to be written using the equivalence between average index and period expressed by Equation (17). Then, the target period profile $p_0(z)$ can be replaced by a corrected period profile $p_c(z)$ given by:

$$p_c(z) = p_0(z) + \delta p_{tc}(z), \quad (39)$$

where $$\delta p_{tc}(z) = \frac{p_0(z)}{n_{\mathit{eff}0}(z)} \cdot \Delta n_{\mathrm{eff\_tc}}(z). \quad (40)$$

Figure 7:
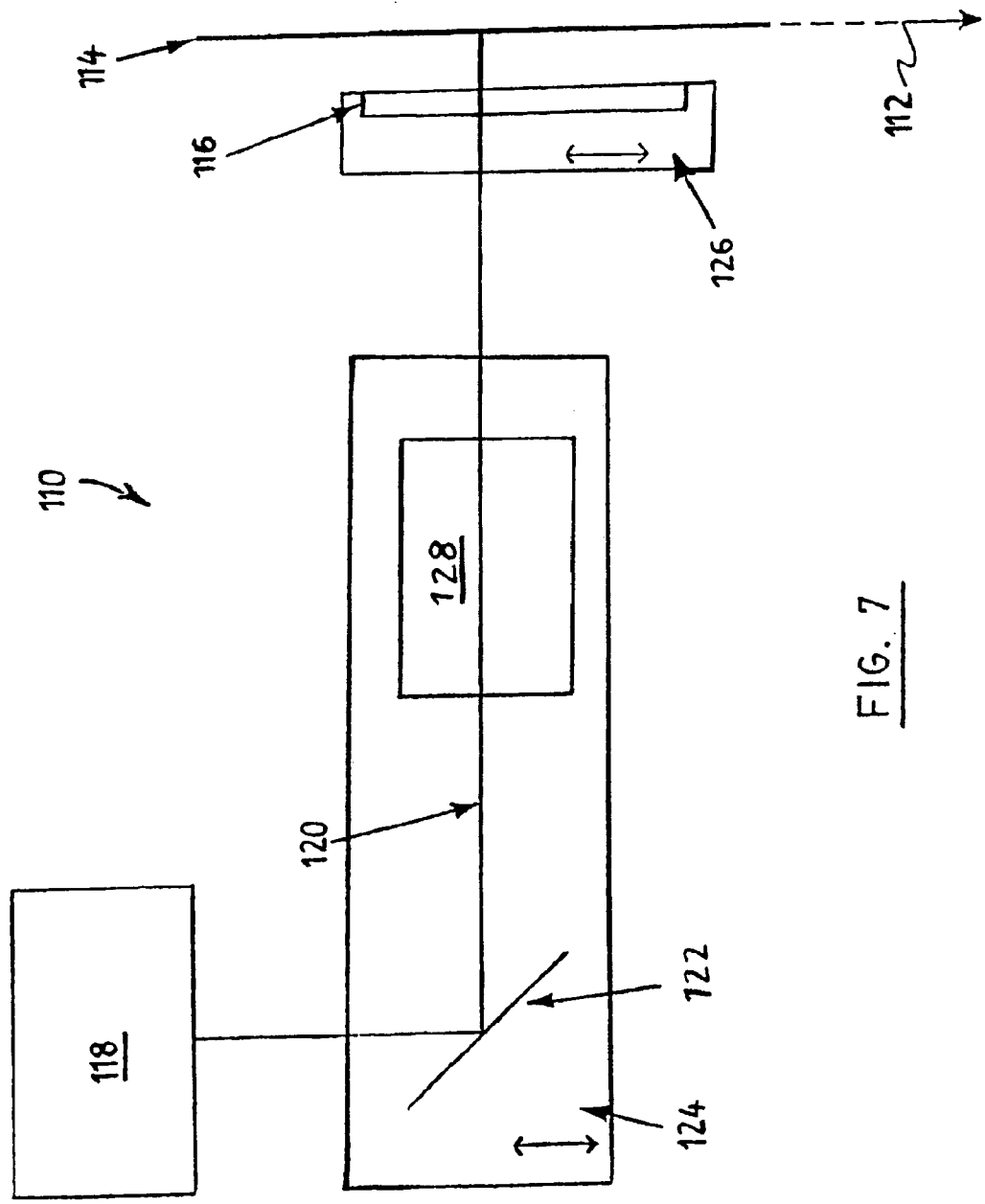
FIG. 7 is a side view of an optical system to write test gratings and improved gratings according to a preferred embodiment of the invention.

Referring to FIG. 7, there is shown an exemplary optical system to write the test gratings and improved gratings according to a preferred embodiment of the invention. An example of an appropriate method to write complex period profiles using such a system is disclosed in U.S. Pat. No. 6,501,883 (PAINCHAUD et al), which is incorporated herein by reference.

The optical system 110 first includes a phase mask 116 provided proximate the photosensitive medium 114 along the propagation axis 112. A light source 118, preferably a UV laser source, is also provided and generates a light beam 120 which is directed to project through a portion of the phase mask 116. This in turn generates a light beam with a modulated intensity profile which impinges on the photosensitive medium 114 to locally record therein a portion of the optical grating having a characteristic period.

Means for moving the light beam 120 along the propagation axis 112 of the photosensitive medium 114, to successively record portions of the optical grating therealong, are further provided. In the illustrated embodiment, these moving means include a 45° mirror 122 disposed to redirect the light beam 120 from the light source 118 towards the phase mask 116, this mirror being mounted on a translation stage 124.

Similarly, means for moving the phase mask 116 in a direction parallel to the moving of the light beam 120 and concurrently thereto are provided. Preferably, this is embodied by a second translation stage 126 on which the phase mask 116 is mounted. The relative movements of the phase mask 116 and the light beam 120 are adjusted to locally tune the characteristic period of each portion of the optical grating.

Appropriate optical components forming an optical assembly 128 may further be provided to give the light beam 120 a wavefront curvature along the direction of the waveguiding axis. The wavefront radius of curvature, in the plane of the phase mask, is selected to generally optimize the efficiency of the recording of the optical grating.

Experimental Results Obtained Using Preferred Embodiments of the Invention

Referring to FIG. 3A and FIG. 3B, there is shown the GDR as a function of wavelength respectively before and after the application of a post-correction to a chirped fiber Bragg grating, according to a preferred embodiment of the invention.

The application of the post-correction was done by superimposing a UV-induced spatially-dependent average index correction using a scanning technique. Varying the power of the UV beam during the scanning process allowed inducing a non-uniform index change. This process can be calibrated such that, for a given scan speed, a given UV power causes a known index change.

As can be seen from a comparison of FIGS. 3A and 3B, the application of the correction visibly improved the optical properties of the grating. The amplitude of the GDR was reduced from 33 ps to 14 ps peak-to-peak which corresponds to more than a factor of 2 in improvement.

A pre-correction was also successfully tested on a 4-channel dispersion compensation grating, having a dispersion of about −1500 ps/nm. Three non-corrected gratings were written from which systematic GDR was observed. The measured properties of one of them are shown in FIGS. 4A to 4D. Then a correction period profile was calculated from these gratings and applied to another grating from which the characterization, shown in FIG. 5 was obtained. Significant improvements to the optical characteristics have been obtained, noteworthy on the GDR (18 ps peak-to-peak compared to 49 ps) and the reflectivity flatness (0.29 dB compared to 0.72 dB).

Of course, numerous modifications could be applied to the embodiments described above without departing from the scope of the present invention as defined in the appended claims.

The invention claimed is:

1. A method for improving optical properties of a Bragg grating having a spatial refractive index profile along a propagation axis, comprising the steps of:
   a) Characterising defects of the spatial refractive index profile of said Bragg grating, said characterising comprising the substeps of:
      i. Measuring optical properties of said grating;
      ii. Reconstructing the spatial refractive index profile of said grating based on said measured optical properties; and
      iii. Comparing the reconstructed spatial refractive index profile with a target spatial refractive index profile;
   b) Calculating an average index correction to the spatial refractive index profile as a function of the defects characterised in step a); and
   c) Applying said average index correction to the Bragg grating.

2. The method according to claim 1, wherein step a) comprises obtaining a period defects function $\delta p(z)$.

3. The method according to claim 2, wherein the calculating of step b) comprises calculating a period correction function $\Delta n_{\mathit{eff\_cp}}(z)$ given by:

$$\Delta n_{\mathrm{eff\_cp}}(z) = -\frac{n_{\mathit{eff}0}(z)}{p_0(z)} \cdot \delta p(z)$$

where z is the propagation axis of the grating, $n_{\mathit{eff}0}(z)$ is a target average effective index and $p_0(z)$ is a target local period.

4. The method according to claim 1, wherein step a) comprises obtaining an apodization defects function $\delta_n(z)$.

5. The method according to claim 4, wherein the calculating of step b) comprises calculating an apodization correction function $\Delta n_{\mathit{eff\_ca}}(z)$ based on a frequency domain analysis of the apodization defects function.

6. The method according to claim 5, wherein said apodization correction function compensates for a front parasitic reflection in said frequency domain.

7. The method according to claim 6, wherein said front parasitic reflection is on a blue side of an ideal reflection spectrum of said grating, and said apodization correction function is given by:

$$\Delta n_{\text{eff\_ca}}(z) = \frac{n_{\text{eff}0}(z) \cdot p_0(z)}{2\pi} \int_0^\infty (A_c(\alpha)\cos(\alpha z) + A_s(\alpha)\sin(\alpha z))\alpha\, d\alpha$$

where z is the propagation axis of the grating, $n_{\text{eff}0}(z)$ is a target average effective index, $p_0(z)$ is a target local period and $A_s(\alpha)$ and $A_c(\alpha)$ are Fourier coefficients of said frequency domain analysis.

8. The method according to claim 6, wherein said front parasitic reflection is on a red side of an ideal reflection spectrum of said grating, and said apodization correction function is given by:

$$\Delta n_{\text{eff\_ca}}(z) = -\frac{n_{\text{eff}0}(z) \cdot p_0(z)}{2\pi} \int_0^\infty \left(A_c(\alpha)\cos(\alpha z) + A_s(\alpha)\sin(\alpha z)\right)\alpha\, d\alpha$$

where z is the propagation axis of the grating, $n_{\text{eff}0}(z)$ is a target average effective index, $p_0(z)$ is a target local period and $A_s(\alpha)$ and $A_c(\alpha)$ are Fourier coefficients of said frequency domain analysis.

9. The method according to claim 1, wherein step a) comprises obtaining a period defects function $\delta p(z)$ and an apodization defects function $\delta_n(z)$.

10. The method according to claim 9, wherein the calculating of step b) comprises the sub-steps of:
   i. calculating a period correction function $\Delta n_{\text{eff\_cp}}(z)$ given by:

$$\Delta n_{\text{eff\_cp}}(z) = -\frac{n_{\text{eff}0}(z)}{p_0(z)} \cdot \delta p(z)$$

where z is the propagation axis of the grating, $n_{\text{eff}0}(z)$ is a target average effective index and $p_0(z)$ is a target local period;
   ii. calculating an apodization correction function $\Delta n_{\text{eff\_ca}}(z)$ based on a frequency domain analysis of the apodization defects function, said apodization correction function compensating for a front parasitic reflection in said frequency domain appearing on a blue side of an ideal reflection from said grating, said apodization correction function being given by:

$$\Delta n_{\text{eff\_ca}}(z) = \frac{n_{\text{eff}0}(z) \cdot p_0(z)}{2\pi} \int_0^\infty \left(A_c(\alpha)\cos(\alpha z) + A_s(\alpha)\sin(\alpha z)\right)\alpha\, d\alpha$$

where $A_s(\alpha)$ and $A_c(\alpha)$ are Fourier coefficients of said frequency domain analysis; and
   iii. calculating the average index correction function as a sum of the period correction function, the apodization correction function and a uniform index change offset selected to render said average index correction strictly positive.

11. The method according to claim 9, wherein the calculating of step b) comprises the sub-steps of:
   i. calculating a period correction function $\Delta n_{\text{eff\_cp}}(z)$ given by:

$$\Delta n_{\text{eff\_cp}}(z) = -\frac{n_{\text{eff}0}(z)}{p_0(z)} \cdot \delta p(z)$$

where z is the propagation axis of the grating, $n_{\text{eff}0}(z)$ is a target average effective index and $p_0(z)$ is a target local period;
   ii. calculating an apodization correction function $\Delta n_{\text{eff\_ca}}(z)$ based on a frequency domain analysis of the apodization defects function, said apodization correction function compensating for a front parasitic reflection in said frequency domain appearing on a red side of an ideal reflection from said grating, said apodization correction function being given by:

$$\Delta n_{\text{eff\_ca}}(z) = -\frac{n_{\text{eff}0}(z) \cdot p_0(z)}{2\pi} \int_0^\infty \left(A_c(\alpha)\cos(\alpha z) + A_s(\alpha)\sin(\alpha z)\right)\alpha\, d\alpha$$

where $A_s(\alpha)$ and $A_c(\alpha)$ are Fourier coefficients of said frequency domain analysis; and
   iii. calculating the average index correction function as a sum of the period correction function, the apodization correction function and a uniform index change offset selected to render said average index correction strictly positive.

12. The method according to claim 1, wherein substep a) i. comprises measuring at least one reflectivity spectrum of said Bragg grating.

13. The method according to claim 1, wherein substep a) i. comprises measuring at least one transmission spectrum of said Bragg grating.

14. The method according to claim 1, wherein substep a) i. comprises measuring at least one group delay spectrum in reflection of said Bragg grating.

15. The method according to claim 1, wherein substep a) i. comprises measuring at least one group delay spectrum in transmission of said Bragg grating.

16. The method according to claim 1, wherein substep a) i. comprises measuring optical properties of said grating from two opposite ends thereof.

17. The method according to claim 1, wherein the reconstructing of substep a) ii. comprises using a reconstruction algorithm.

18. The method according to claim 17, wherein said reconstruction algorithm is based on a Layer Peeling method.

19. The method according to claim 1, wherein step c) comprises photoinducing said average index correction over said Bragg grating.

20. The method according to claim 19, wherein step c) comprises exposing the Bragg grating to a spatially variable dose of UV light along the propagation axis of said grating.

21. The method according to claim 20, wherein step c) comprises the sub-steps of:
   i. impinging a UV light beam on said Bragg grating;
   ii. scanning said UV light beam along the propagation axis of the grating; and
   iii. varying the intensity of the UV light beam during said scanning to produce said average index correction.

22. A method for making an improved Bragg grating using an optical system generating systematic defects, comprising the steps of:
   a) making at least one test Bragg grating using said optical system set up to produce a target spatial refractive index profile;
   b) characterising period defects and apodization defects of said test Bragg grating to respectively obtain a period defects function δp(z) and an apodization defects function $\delta_n(z)$;
   c) calculating an average index correction to the target spatial refractive index profile as a function of the period and apodization defects functions;
   d) calculating a corrected spatial refractive index profile using said average index correction; and
   e) making said improved Bragg grating using said optical system set up to produce the corrected spatial refractive index profile.

23. The method according to claim 22, wherein the characterising of step b) comprising the substeps of:
   i. Measuring optical properties of said test Bragg grating;
   ii. Reconstructing an apodization profile and a period profile of said test Bragg grating based on said measured optical properties; and
   iii. Comparing the reconstructed period and apodization profiles with target profiles thereof.

24. The method according to claim 23, wherein the reconstructing of substep b) ii. comprises using a reconstruction algorithm.

25. The method according to claim 24, wherein said reconstruction algorithm is based on a Layer Peeling method.

26. The method according to claim 22, wherein the average index correction calculated in step c) is given by:

$$\Delta n_{\mathit{eff\_tc}}(z) = \Delta n_{\mathit{eff\_cp}}(z) + \Delta n_{\mathit{eff\_ca}}(z)$$

where $\Delta n_{\mathit{eff\_cp}}(z)$ is a period correction function and $\Delta n_{\mathit{eff\_ca}}(z)$ is an apodization correction function.

27. The method according to claim 26, wherein the period correction function is given by:

$$\Delta n_{\mathrm{eff\_cp}}(z) = -\frac{n_{\mathit{eff}0}(z)}{p_0(z)} \cdot \delta p(z)$$

where z is the propagation axis of the grating, $n_{\mathit{eff}0}(z)$ is a target average effective index and $p_0(z)$ is a target local period.

28. The method according to claim 26, wherein the apodization correction function is based on a frequency domain analysis of the apodization defects function.

29. The method according to claim 28, wherein said apodization correction function compensates for a front parasitic reflection in said frequency domain.

30. The method according to claim 29, wherein said front parasitic reflection is on a blue side of an ideal reflection from said test grating, and said apodization correction function is given by:

$$\Delta n_{\mathrm{eff\_ca}}(z) = \frac{n_{\mathit{eff}0}(z) \cdot p_0(z)}{2\pi} \int_0^\infty (A_c(\alpha)\cos(\alpha z) + A_s(\alpha)\sin(\alpha z))\alpha\, d\alpha$$

where z is the propagation axis of the grating, $n_{\mathit{eff}0}(z)$ is a target average effective index, $p_0(z)$ is a target local period and $A_s(\alpha)$ and $A_c(\alpha)$ are Fourier coefficients of said frequency domain analysis.

31. The method according to claim 29, wherein said front parasitic reflection is on a red side of an ideal reflection from said test grating, and said apodization correction function is given by:

$$\Delta n_{\mathrm{eff\_ca}}(z) = -\frac{n_{\mathit{eff}0}(z) \cdot p_0(z)}{2\pi} \int_0^\infty (A_c(\alpha)\cos(\alpha z) + A_s(\alpha)\sin(\alpha z))\alpha\, d\alpha$$

where z is the propagation axis of the grating, $n_{\mathit{eff}0}(z)$ is a target average effective index, $p_0(z)$ is a target local period and $A_s(\alpha)$ and $A_c(\alpha)$ are Fourier coefficients of said frequency domain analysis.

32. The method according to claim 22, wherein the corrected spatial refractive index profile calculated in step d) is obtained by adding the average index correction to the target spatial refractive index profile.

33. The method according to claim 22, wherein the corrected spatial refractive index profile calculated in step d) is obtained by replacing a period profile of the target spatial refractive index profile by a corrected period profile given by:

$$p_c(z) = p_0(z) + \frac{p_0(z)}{n_{\mathit{eff}0}(z)} \cdot \Delta n_{\mathrm{eff\_tc}}(z)$$

where z is the propagation axis of the grating, $p_0(z)$ is a target period profile, $n_{\mathit{eff}0}(z)$ is a target average refractive index and $\Delta n_{\mathit{eff\_tc}}(z)$ is average index correction calculated in step c).

* * * * *